(12) United States Patent
Kimura

(10) Patent No.: US 10,437,530 B2
(45) Date of Patent: Oct. 8, 2019

(54) COMMUNICATION TERMINAL, METHOD OF CONTROLLING COMMUNICATION TERMINAL AND NON-TRANSITORY STORAGE MEDIUM FOR ADDING USER AUTHENTICATION INFORMATION TO PRINT DATA IN HANDOVER ENABLE OR DISABLE STATE

(71) Applicant: CANON KABUSHIKI KAISHA, Tokyo (JP)

(72) Inventor: Hiromi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/973,952

(22) Filed: May 8, 2018

(65) Prior Publication Data

US 2018/0335985 A1 Nov. 22, 2018

(30) Foreign Application Priority Data

May 22, 2017 (JP) .................. 2017-101044

(51) Int. Cl.
*G06F 3/12* (2006.01)
*H04N 1/00* (2006.01)
*B42D 25/333* (2014.01)

(52) U.S. Cl.
CPC .......... *G06F 3/1222* (2013.01); *G06F 3/1238* (2013.01); *G06F 3/1292* (2013.01); *H04N 1/00315* (2013.01); *H04N 1/00411* (2013.01); *B42D 25/333* (2014.10); *H04N 2201/0094* (2013.01)

(58) Field of Classification Search
None
See application file for complete search history.

(56) References Cited

U.S. PATENT DOCUMENTS

2015/0339561 A1* 11/2015 Takenaka ................. B41J 29/00
358/1.14
2016/0212300 A1* 7/2016 Yamada ............... H04N 1/4413
2016/0292553 A1* 10/2016 Nagasawa .......... G06K 15/4095

FOREIGN PATENT DOCUMENTS

JP 2012-119003 A 6/2012

* cited by examiner

*Primary Examiner* — Benny Q Tieu
*Assistant Examiner* — Haris Sabah
(74) *Attorney, Agent, or Firm* — Canon U.S.A., Inc., IP Division

(57) ABSTRACT

A mobile terminal can set a user credential used to log into an image processing apparatus and transmit print data to the image processing apparatus. The mobile terminal displays a screen that receives a print setting with respect to the print data to be transmitted. The mobile terminal also displays, in response to receipt of a user instruction to display a screen configured to receive a setting of authentication information, as a screen that receives the print setting, the screen configured to receive the setting of the authentication information to be added to the print data and on which the user credential used to log in is reflected.

15 Claims, 15 Drawing Sheets

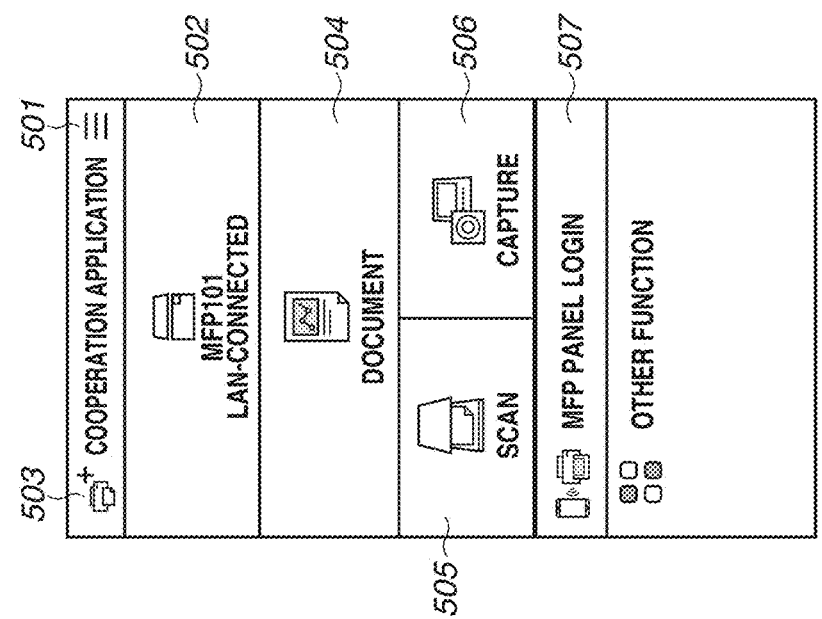

FIG.6A
DOCUMENT SELECTION SCREEN

| < | DOCUMENT | EDIT |

🔍 SEARCH

📄 20170331121132.pdf  >
   1.5 MB   2017/03/31 12:11
📄 20170331155854.pdf  >
   11.6 MB  2017/03/31 15:58
📄 20170406163857.pdf  >
   5.2 MB   2017/04/06 16:38
📄 20170406164002.pdf  >
   7.1 MB   2017/04/06 16:40

↻

— 601

FIG.6B
PREVIEW SCREEN

< PREVIEW

HANDOUT ○○○

1/1 — 611

PRINTER   MFP101
          192.168.1.102 — 612

A4                    — 613
ONE COPY
PRINT ALL

[ PRINT ] — 614

FIG.9A
PRINT SETTING SCREEN

| < PRINT SETTING | |
|---|---|
| OUTPUT METHOD<br>PRINT | > ~902 |
| USER MANAGEMENT METHOD<br>OFF | > ~901 |
| OUTPUT SHEET SIZE<br>A4 | > |
| NUMBER OF COPIES<br>1 | > |
| PRINT AREA<br>ALL | > |
| SHEET FEEDER<br>AUTO | > |
| COLOR SELECTION<br>AUTO | > |
| TWO-SIDED | ⊙ |
| STAPLE | ⊙ |
| 2 in 1 | ⊙ |

FIG.9B
USER MANAGEMENT FUNCTION MANAGEMENT SCREEN

| < USER MANAGEMENT FUNCTION | |
|---|---|
| OFF | |
| DEPARTMENT ID MANAGEMENT | ⓘ |
| ✓ USER AUTHENTICATION | ⓘ ~912 |

FIG.9C
SETTING SCREEN FOR SETTING USER AUTHENTICATION INFORMATION

| < USER AUTHENTICATION | | |
|---|---|---|
| USER NAME | 1 | ~921 |
| PASSWORD | * | ~922 |
| CHECK AUTHENTICATION INFORMATION AT THE TIME OF PRINTING | ⊙ | ~923 |

FIG.9D
SELECTION SCREEN FOR SETTING OUTPUT METHOD

| < OUTPUT METHOD | | |
|---|---|---|
| ✓ PRINT | | |
| SAVE | ⓘ | |
| SECURE PRINT | ⓘ | |
| USER NAME | 1 | ~931 |
| DOMAIN NAME | | ~932 |

CHECK SCREEN

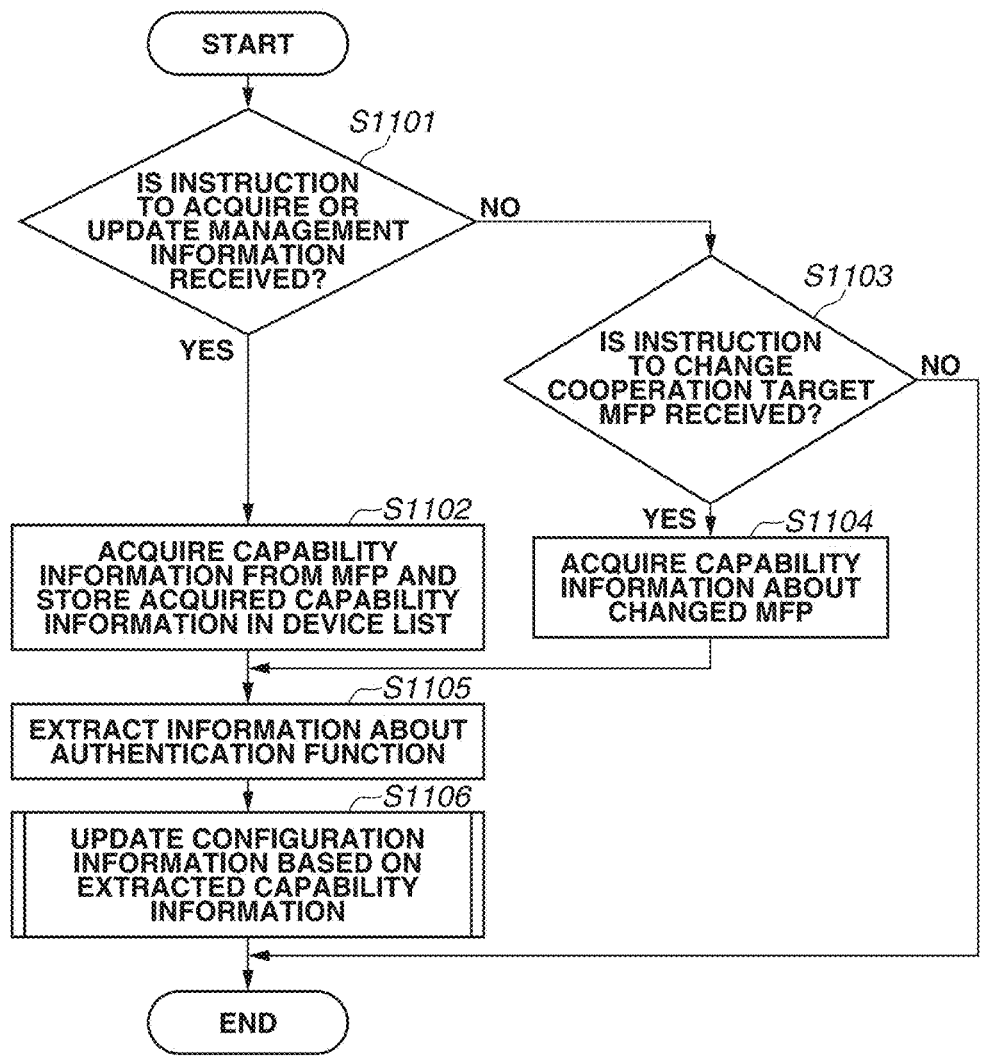

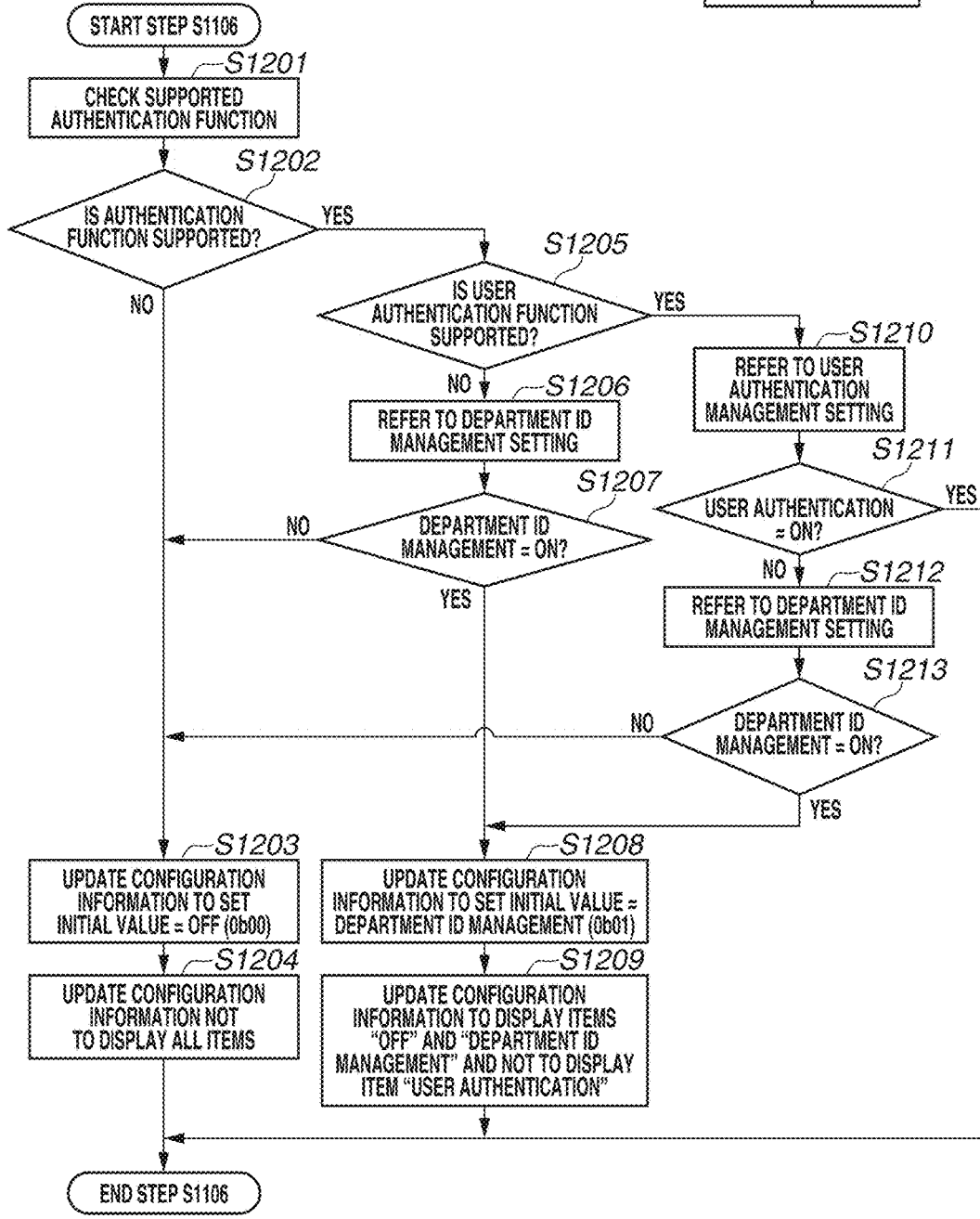

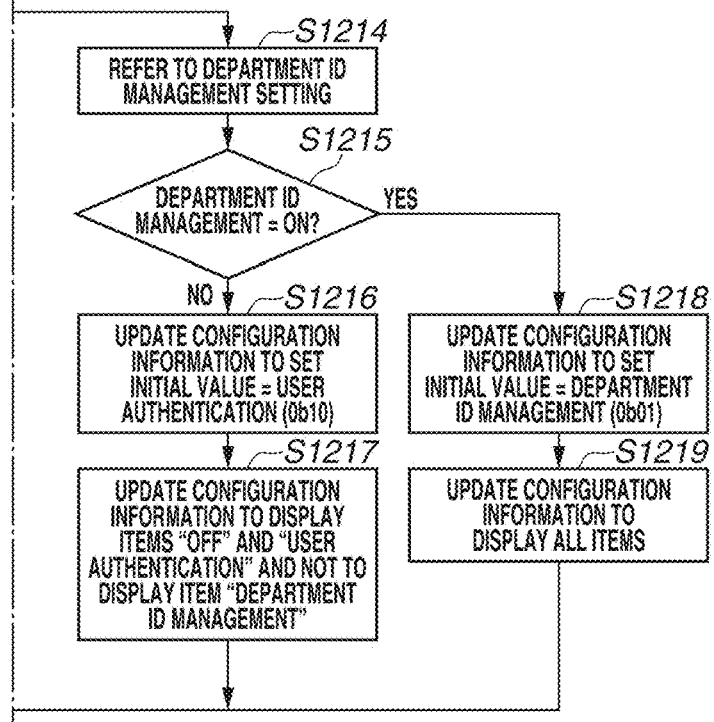

FIG.13A

| DEPARTMENT ID MANAGEMENT FUNCTION | USER AUTHENTICATION FUNCTION | USE OF USER AUTHENTICATION FUNCTION | USE OF DEPARTMENT ID MANAGEMENT FUNCTION | OFF | DEPARTMENT ID MANAGEMENT | USER AUTHENTICATION |
|---|---|---|---|---|---|---|
| SUPPORTED | SUPPORTED | OFF | OFF | — | — | — |
|  |  | OFF | ON | ○ | ○* | — |
|  |  | ON | OFF | ○ | — | ○* |
|  |  | ON | ON | — | ○* | ○ |
| SUPPORTED | NOT SUPPORTED | — | OFF | — | — | — |
|  |  | — | ON | ○ | ○* | — |
| NOT SUPPORTED | NOT SUPPORTED | — | — | — | — | — |

*...INITIAL VALUE

FIG.13B

| DEPARTMENT ID MANAGEMENT | USER AUTHENTICATION | INITIAL VALUE |
|---|---|---|
| OFF | 1 or 0 | 0 |
| 1 or 0 | 1 or 0 | 0-2 |

1: DISPLAY
2: NOT DISPLAY

0: OFF
1: DEPARTMENT ID AUTHENTICATION
2: USER AUTHENTICATION

FIG.14A
PRINT SETTING SCREEN WITHOUT DISPLAYING MANAGEMENT FUNCTION

| < PRINT SETTING | |
|---|---|
| OUTPUT METHOD<br>PRINT | > |
| OUTPUT SHEET SIZE<br>A4 | > |
| NUMBER OF COPIES<br>1 | > |
| PRINT AREA<br>ALL | > |
| SHEET FEEDER<br>AUTO | > |
| COLOR SELECTION<br>COLOR | > |
| TWO-SIDED | ⊙◯ |
| 2 in 1 | ⊙◯ |

FIG.14B
USER MANAGEMENT FUNCTION SCREEN A

| < USER MANAGEMENT FUNCTION | |
|---|---|
| OFF | |
| ✓ DEPARTMENT ID MANAGEMENT | ⓘ |
| USER AUTHENTICATION | ⓘ |

FIG.14C
USER MANAGEMENT FUNCTION SCREEN B

| < USER MANAGEMENT FUNCTION | |
|---|---|
| OFF | |
| ✓ USER AUTHENTICATION | ⓘ |

FIG.14D
USER MANAGEMENT FUNCTION SCREEN C

| < USER MANAGEMENT FUNCTION | |
|---|---|
| OFF | |
| ✓ DEPARTMENT ID MANAGEMENT | ⓘ |

COMMUNICATION TERMINAL, METHOD OF CONTROLLING COMMUNICATION TERMINAL AND NON-TRANSITORY STORAGE MEDIUM FOR ADDING USER AUTHENTICATION INFORMATION TO PRINT DATA IN HANDOVER ENABLE OR DISABLE STATE

BACKGROUND

Field

The present disclosure relates to a communication terminal configured to cooperate with an image processing apparatus.

Description of the Related Art

An image processing apparatus provides various functions such as a print function, a copy function, and a file transmission function for users. To use a function provided by an image processing apparatus, the user needs to log in to the image processing apparatus. As to a method in which a user logs in to an image processing apparatus, Japanese Patent Application Laid-Open No. 2012-119003 discusses a method in which when a communication terminal such as a mobile terminal approaches the image processing apparatus, a login request is transmitted to the image processing apparatus to allow the user to log in to the image processing apparatus.

Further, there are image processing apparatuses capable of performing authentication printing in view of security in a case of printing based on print data received from an external device such as a personal computer (PC). Japanese Patent Application Laid-Open No. 2012-119003 discusses an authentication printing system where an external device generates print data containing user authentication information or authentication information such as a department identifier (ID) and a password and transmits the generated print data to the image processing apparatus. Meanwhile, the image processing apparatus judges whether the user authentication information or the department ID and the password added to the print data received from the external device match authentication information managed in the image processing apparatus, and if they match, the image processing apparatus outputs print data.

SUMMARY

According to an aspect of the present disclosure, a communication terminal configured to communicate with an image processing apparatus includes a display device, a memory device that stores a set of instructions, and at least one processor that executes the instructions, the instructions, when executed, causing the communication terminal to perform operations including setting a user credential that is used to log into the image processing apparatus, displaying, on the display device, a screen that receives a print setting with respect to print data to be transmitted to the image processing apparatus, and displaying on the display device, in response to receipt of a user instruction to display a screen that receives a setting of authentication information to be added to the print data, the screen that receives the setting of the authentication information to be added to the print data and on which the setting of the authentication information reflects the user credential that is used to log in.

Further features will become apparent from the following description of exemplary embodiments with reference to the attached drawings.

BRIEF DESCRIPTION OF THE DRAWINGS

FIGS. 5A and 5B illustrate an example of a screen displayed on an operation unit of the communication terminal.
FIGS. 6A and 6B illustrate an example of the screen displayed on the operation unit of the communication terminal.
FIGS. 9A, 9B, 9C, and 9D illustrate an example of the screen displayed on the operation unit of the communication terminal.
FIG. 11 is a flowchart illustrating control of the communication terminal.
FIGS. 12A and 12B are a flowchart illustrating control of the communication terminal.
FIGS. 13A and 13B illustrate a correspondence between capability information acquired from the MFP and configuration information.
FIGS. 14A, 14B, 14C, and 14D illustrate an example of the screen displayed on the operation unit of the communication terminal.

DESCRIPTION OF THE EMBODIMENTS

Various exemplary embodiments will be described below with reference to the drawings.

In the following exemplary embodiments, an application for cooperating with an image processing apparatus that is provided for a communication terminal to facilitate the use of the image processing apparatus from the communication terminal will be described. The cooperation application includes a plurality of cooperation functions such as a cooperation login function that causes a user to log in to the image processing apparatus and a print function that transmits print data to the image processing apparatus.

The cooperation application is provided with a scheme for setting user authentication information as a print setting to be added to print data to enable authentication printing from the cooperation application.

The cooperation application is provided with a scheme for setting user authentication information for use in cooperation login to enable execution of the cooperation login function from the cooperation application.

A scheme is provided that simplifies the setting of authentication information needed for authentication printing using user information that is used to log in, in a case where user authentication information for login is already set in a mobile terminal. In another aspect of the present exemplary embodiment, a scheme is provided that simplifies the setting of user information for use in processing. The exemplary embodiments described below are not intended to limit the invention, and not every combination of features described in the exemplary embodiments is always essential to a technical solution of the present disclosure.

Figure 1:
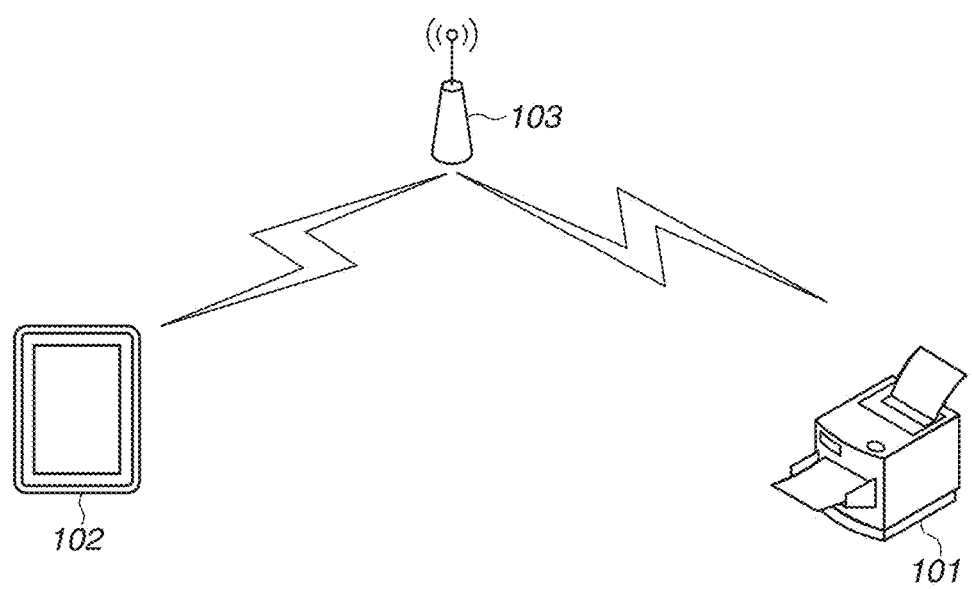
FIG. 1 schematically illustrates a print system.

First, the configuration of a print system according to an exemplary embodiment will be described below with reference to FIG. 1. A print system according to a first exemplary embodiment includes a communication terminal 102, a multi-function peripheral (MFP) 101, and an access point (AP) 103.

The communication terminal 102 executes wireless communication based on the Institute of Electrical and Electronics Engineers (IEEE) 802.11 standard (hereinafter, "802.11 standard"). The user inputs to the communication terminal 102 a service set identifier (SSID) and a security key for connecting to the AP 103 so that the communication terminal 102 can connect to a network provided by the AP 103.

The MFP 101 is a multi-function apparatus including functions such as a scan function, a print function, and a copy function. If the SSID and the security key for connecting to the AP 103 are set as the wireless network settings of the MFP 101, the communication terminal 102 and the MFP 101 can perform wireless communication via the AP 103. The MFP 101 can receive print data from the communication terminal 102 through wireless communication and print the print data.

The MFP 101 in the present exemplary embodiment can perform user authentication management based on user login from the point of view of security. The MFP 101 can perform department identifier (ID) management to limit users based on a department ID and a password. When no user has logged in, the MFP 101 with the user authentication management set to "ON" displays a login screen on an operation unit, and the functions of the MFP 101 are not usable. The MFP 101 determines whether to enable a user to log in based on user authentication information (also referred to as "user credential") received from the user when the login screen is being displayed. If the user can log in, the MFP 101 displays a main screen (also referred to as "main menu") on the operation unit of the MFP 101. Then, the user can use the function of the MFP 101, such as a copy function or a transmission function, via the main screen displayed on the operation unit. Hereinafter, in the present exemplary embodiment, to enable a user to log in to change to the state in which the functions of the MFP 101 are usable via the operation unit of MFP 101 will be referred to as "local login". When the department management of the MFP 101 is set to "ON", the MFP 101 prompts a user to input the department ID and the password on the login screen and determines whether to enable the user to log in.

The MFP 101 can perform authentication printing from the point of view of security at the time of performing printing based on print data received from an external device. In authentication printing, the external device generates print data containing user authentication information or authentication information, such as the department ID and the password, and transmits the generated print data to an image processing apparatus. The MFP 101 determines whether the user authentication information or the department ID and the password added to the print data received from the external device match the authentication information managed in the image processing apparatus, and if they match, the MFP 101 outputs the print data.

The print system according to the present exemplary embodiment includes a mobile cooperation function the communication terminal 102 and the MFP 101 use to cooperate to provide a function for the user. For example, the user possessing the communication terminal 102 brings the communication terminal 102 near the MFP 101 so that the MFP 101 can execute the cooperation login function to enable a specific user to log in. The communication terminal 102 can perform data communication with the MFP 101 using short-range wireless communication. For example, the communication terminal 102 performs data communication for cooperation login using short-range wireless communication.

The communication terminal 102 communicates with the MFP 101 via the AP 103. For example, the communication terminal 102 can transmit and receive print data and scan data to and from the MFP 101 via the AP 103. The communication terminal 102 can also generate print data containing authentication information and transmit the generated print data to a MFP configured to perform authentication printing so that the MFP can also perform printing.

The MFP 101 can also operate in an access point mode. In the case of operating in the access point mode, the MFP 101 operates as a software access point. The communication terminal 102 connects to a software AP provided by the MFP 101 to execute wireless communication directly with the MFP 101 without a relay device such as the AP 103. The communication terminal 102 connects to the MFP 101 using direct wireless communication with the MFP 101 to execute various cooperation functions without the AP 103.

While a smartphone and a tablet PC are described as examples of the communication terminal in the present exemplary embodiment, the communication terminal is not limited to the smartphone and the tablet PC. The communication terminal can be any other device that can execute short range wireless communication.

While the MFP is described as an example of the external device that cooperates with the communication terminal in the present exemplary embodiment, the external device is not limited to the MFP. For example, the present exemplary embodiment is also applicable to a single-function printer or a three-dimensional (3D) printer configured to model an object.

<Communication Terminal>

Figure 2:
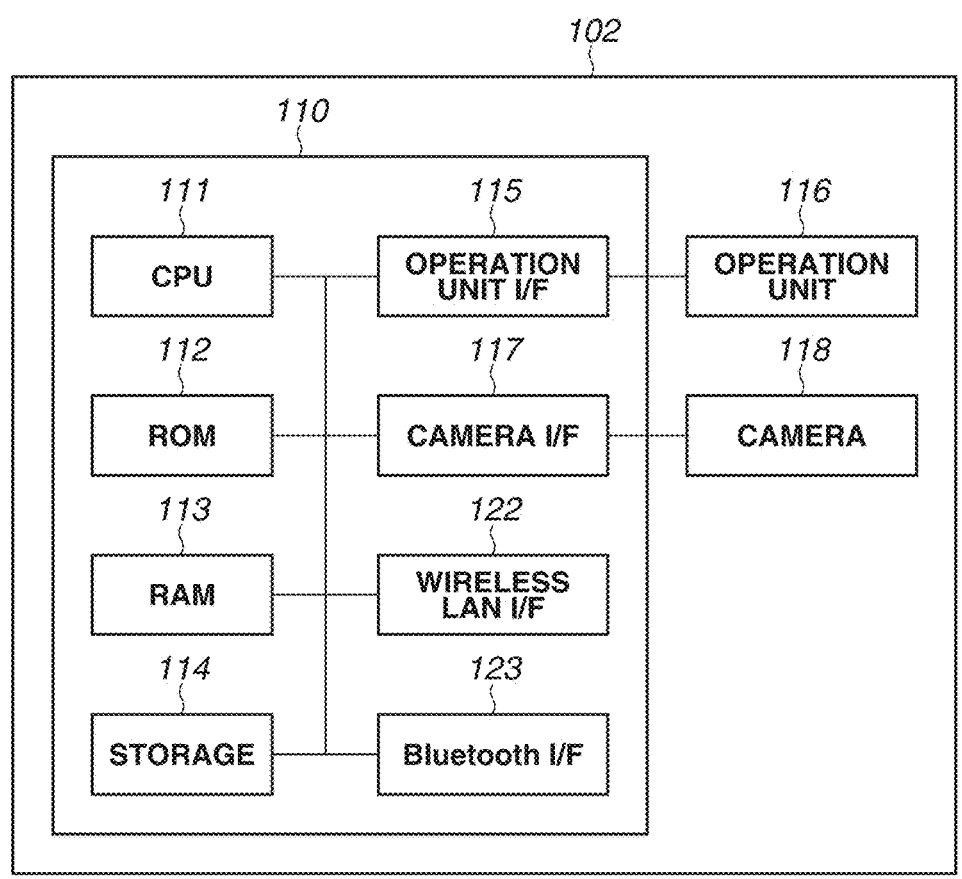
FIG. 2 illustrates an example of the hardware configuration of a communication terminal.

The hardware configuration of the communication terminal 102 will be described below with reference to FIG. 2. A central processing unit (CPU) 111 in a control unit 110 reads a control program stored in a read-only memory (ROM) 112 or a storage 114 to control the communication terminal 102.

The control unit 110 includes the CPU 111, the ROM 112, a random-access memory (RAM) 113, the storage 114, an operation unit interface (I/F) 115, and a camera I/F 117, which are connected to a bus. The control unit 110 includes a wireless local area network (LAN) I/F 122, a Bluetooth® I/F 123 as communication interfaces for communication with external devices. While the wireless LAN I/F 122 and the Bluetooth® I/F 123 are described as separate pieces of hardware in the present exemplary embodiment, the configuration is not limited to the above-described configuration. A combination chip that realizes, with a single piece of hardware, both wireless communication using a wireless LAN and short-range wireless communication using a Bluetooth® module can be provided to realize the wireless communication using a wireless LAN and the short-range wireless communication using a Bluetooth® module.

The CPU 111 is a central processing unit (processor) that controls the entire operation of the control unit 110. The RAM 113 is a volatile memory and is used as a work area and a temporary storage area for loading various control programs stored in the ROM 112 and the storage 114. The ROM 112 is a non-volatile memory and stores a boot program of the communication terminal 102, etc. The storage 114 is a non-volatile flash memory with a higher storage capacity than the RAM 113. The storage 114 stores a program for controlling the communication terminal 102. An operating system (OS) 300 and a cooperation application 310 are also stored in the storage 114.

The CPU 111 executes the boot program stored in the ROM 112 at the time of activating the communication terminal. The boot program is a program that reads a program of the OS 300 stored in the storage 114 and loads the read program into the RAM 113. The CPU 111 executes the boot program and then executes the program of the OS 300 loaded in the RAM 113 and controls the communication terminal 102. The CPU 111 also stores in the RAM 113 data for use in operations based on the control program and performs writing and reading.

While the single CPU 111 executes various types of processing specified in the below-described flowcharts in the communication terminal 102, any other form can be employed. For example, a plurality of CPUs or microprocessors (MPUs) can cooperate to execute various types of processing specified in the below-described flowcharts. Some of the processing can be executed using a hardware circuit, such as an application-specific integrated circuit (ASIC). Some of the processing, such as print preview generation and print data generation, can be realized in cooperation with a cloud service or the like, which is accessible via a network.

The operation unit I/F 115 connects an operation unit 116 and the control unit 110 to each other. The operation unit 116 includes a touch panel and a display panel. The touch panel can detect user touch operations, and the display panel displays various screens. The operation unit 116 functions as a display unit that displays information and as an acceptance unit that accepts user instructions. The operation unit 116 displays various screens provided by the OS 300 and the cooperation application 310. The user can input a desired operation instruction to the communication terminal 102 by placing an object, such as the user's finger, on the operation unit 116 to perform a touch operation. The operation unit 116 also includes hardware keys. The user can input an operation instruction to the communication terminal 102 by pressing the hardware keys.

The camera I/F 117 connects the control unit 110 and a camera 118. The camera 118 captures images based on user instructions to capture images. Images captured by the camera 118 are stored in a predetermined area of the storage 114.

The wireless LAN I/F 122 provides a wireless client function for performing wireless communication based on the 802.11 standard. The wireless LAN I/F 122 connects to an external AP to execute wireless communication based on the 802.11 standard. The external AP can be the MFP 101, which operates in the access point mode or the AP 103.

The Bluetooth® I/F 123 transmits and receives data through short-range wireless communication with various peripheral devices. In the present exemplary embodiment, the cooperation login function that enables the specific user to log into the MFP 101 is executed using wireless communication based on Bluetooth® (IEEE 802.15.1), especially Bluetooth® Low Energy, as an example.

<Software Configuration of Communication Terminal 102>

Figure 3:
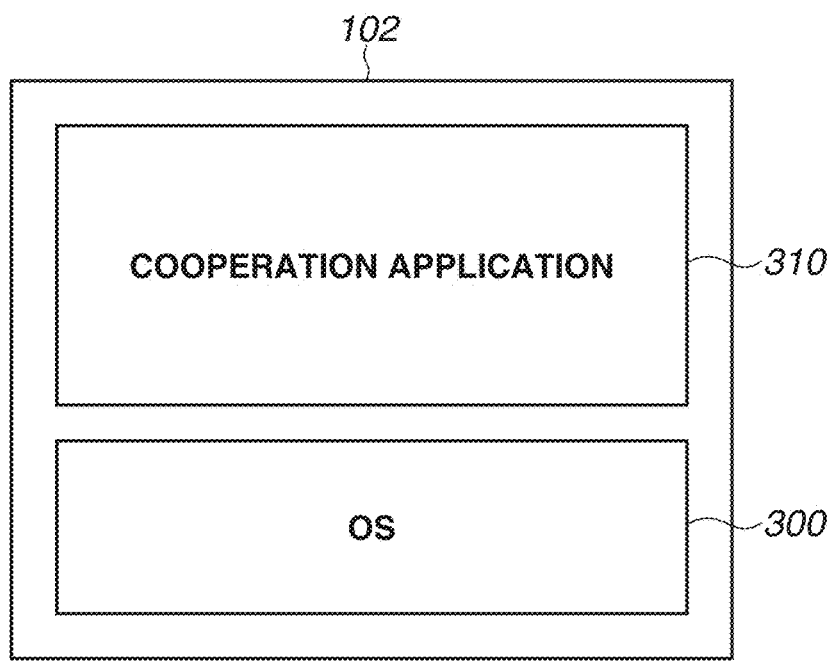
FIG. 3 illustrates an example of the software configuration of the communication terminal.

The software configuration of the communication terminal 102 will be described below with reference to FIG. 3. FIG. 3 is a function block diagram illustrating software realized by the CPU 111 reading a control program stored in the ROM 112 or the storage 114.

The OS 300 is basic software for controlling the entire operation of the communication terminal 102. The OS 300 can be, for example, Google Android™ or Apple® iOS. Various application programs, including the cooperation application 310 described below, can be loaded into the communication terminal 102. The OS 300 can exchange information with the applications to change the screen to be displayed on the operation unit 116 based on an instruction received from the applications.

The OS 300 includes a framework and an application programming interface (API) for controlling the hardware of the communication terminal 102 from various applications, and the OS 300 provides, for an application that runs on the OS 300, a mathematical function for using various types of hardware. The OS 300 controls wireless communication using the wireless LAN I/F 122 based on the 802.11 standard and short-range wireless communication using the Bluetooth® I/F 123, based on an instruction received from the application.

The cooperation application 310 can call the mathematical function provided as the API or the framework for the application by the OS 300 and change an AP to which the communication terminal 102 is to connect to an AP for direction connection that is provided by the MFP.

The cooperation application 310 can store, as internal information, the settings for use in the cooperation function, a device list of cooperation destination MFPs, etc. The device list stores information for managing the cooperation destination MFPs, including the names of external devices, capability information, connection information for connecting to an external device, etc. The cooperation application 310 can accept MFP search processing performed by the user and manual input to register an external device, such as a MFP, in the device list. If the cooperation application 310 receives a user operation to select a MFP registered in the device list from a selection screen (not illustrated), the cooperation application 310 changes the cooperation destination MFP to the selected MFP.

<MFP>

Figure 4:
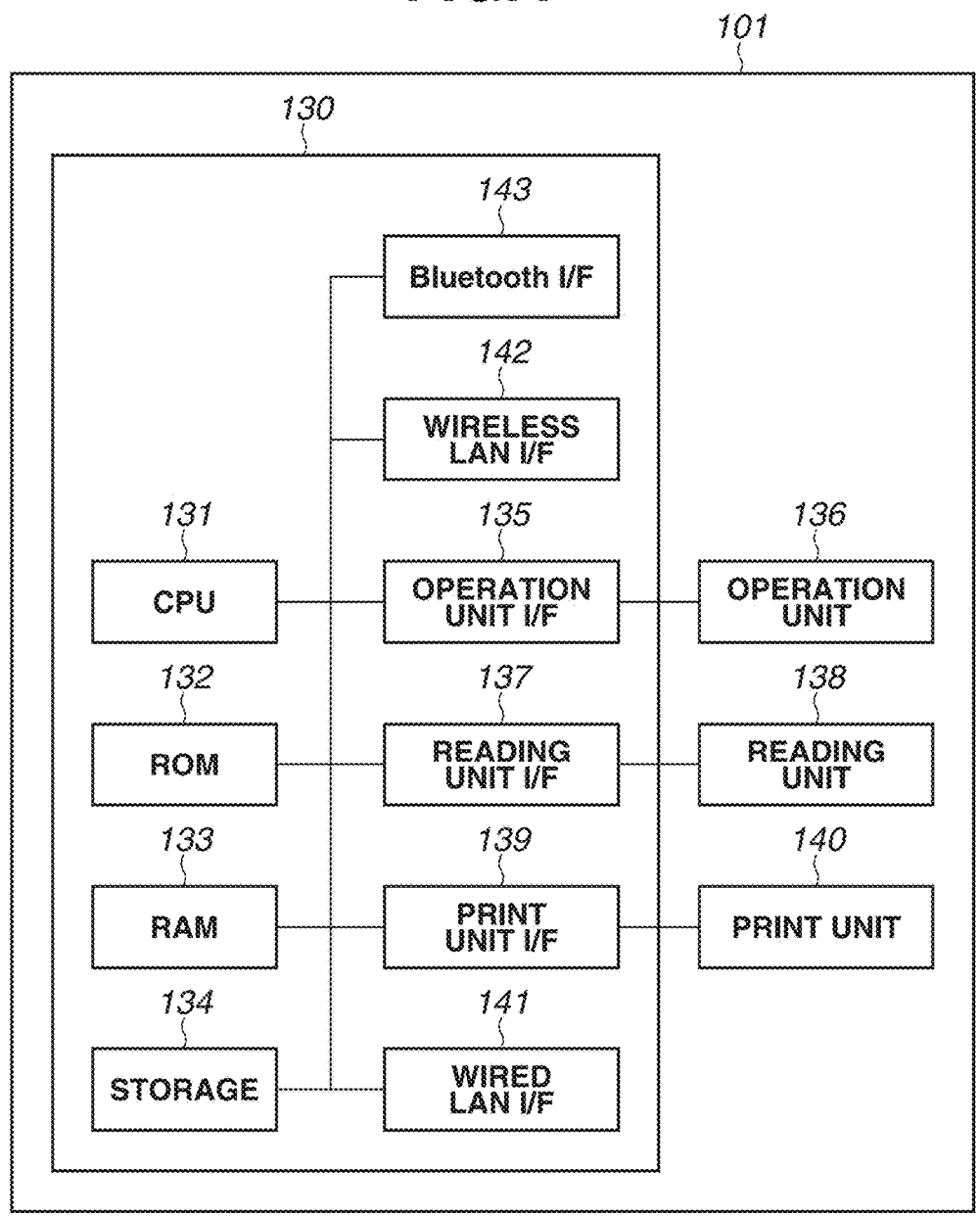
FIG. 4 illustrates an example of the hardware configuration of a multi-function peripheral (MFP).

The MFP 101 will be described below. FIG. 4 is a block diagram illustrating the hardware configuration of the MFP 101. The MFP 101 includes a reading function and a print function. The reading function reads images and the print function prints images on sheets A control unit 130, including a CPU 131, controls the entire operation of the MFP 101. The CPU 131 reads a control program stored in a ROM 132 or a storage 134 and performs various types of control, such as print control and reading control. The ROM 132 stores control programs executable by the CPU 131. A RAM 133 is a main storage memory of the CPU 131 and is used as a work area or a temporary storage area for loading instructions of various control programs. The storage 134 stores print data, image data, various programs, and various types of setting information. The storage 134 stores an authentication management database for use in user authentication management and department ID management. The authentication management database stores user credentials stored for user authentication management and combinations of department IDs and passwords stored for department ID management.

While the single CPU 131 uses the single memory (RAM 133) to realize the control described below in the MFP 101 in the present exemplary embodiment, any other form can be employed. For example, a plurality of processors, RAMs, ROMs, and storages can cooperate to execute the control described below.

An operation unit I/F 135 connects an operation unit 136 and the control unit 130 to each other. The operation unit 136 includes a liquid crystal display unit including a touch panel function and various hardware keys and functions as a display unit that displays information and an acceptance unit that accepts user instructions. A reading unit I/F 137 connects a reading unit 138 and the control unit 130 to each other. The reading unit 138 reads a document and generates a read image. The generated read image is transmitted to an external device or used for printing. A print unit I/F 139 connects a print unit 140 and the control unit 130 to each other. The print unit 140 prints an image on a sheet based on print data received from an external device.

The control unit 130 is connected to a network (not illustrated) via a wired LAN I/F 141. The wired LAN I/F 141 transmits images and information to external devices on the network (not illustrated) and receives print data and information from the external devices. The control unit 130 includes a wireless LAN I/F 142 and a Bluetooth® I/F 143. The wireless LAN I/F 142 provides a wireless client function and a software AP function. The wireless client function is a function for connecting the wireless LAN I/F 142 to an external AP to perform wireless communication. The software AP function is a function that causes the MFP 101 to behave as an AP. The Bluetooth® I/F 143 transmits and receives data to and from various peripheral devices via short-range wireless communication. The MFP 101 in the present exemplary embodiment communicates with the communication terminal 102 using short-range wireless communication based on Bluetooth® Low Energy and executes the cooperation login function to enable the MFP 101 to cause the user to log in using the communication terminal 102.

<External Cooperation Function>

The cooperation function provided by the cooperation application 310 will be described below. The cooperation application 310 includes a plurality of cooperation functions, such as the cooperation login function, which cause a user to log into a MFP and the print function, which transmits print data to the MFP.

In the present exemplary embodiment, user authentication information for cooperation login can be set with respect to the cooperation application 310 to realize the cooperation login function. The set user authentication information for cooperation login is stored in the storage 114 and referenced when needed during the execution of the cooperation login function, the steps of flowcharts described below, or the like. In the present exemplary embodiment, user authentication information can be set as a print setting to be added to print data to enable execution of authentication printing from the cooperation application 310. The set user authentication information as the print setting is stored in the storage 114 and referenced when needed in the flowcharts described below, or the like.

If the user desires to use both the authentication printing by the print function and the local login by the cooperation login function, the user needs to set both the user authentication information for the cooperation login function and the user authentication information for print setting, and this requires time and work.

To address the above-described issue, the present exemplary embodiment improves on the conventional cooperation of a communication terminal and a MFP by using user information for login cooperation in the MFP so that the authentication information setting needed for authentication processing is simplified.

FIGS. 5A, 5B, 6A, and 6B illustrate an example of a screen displayed on the operation unit 116 of the communication terminal 102. Each screen illustrated in FIGS. 5A, 5B, 6A, and 6B is an example of the screen displayed by the cooperation application 310.

If an icon of the cooperation application is selected by a user operation via an application list screen (also referred to as "drawer") or a home screen of the communication terminal 102, the CPU 111 activates the cooperation application 310. If the activation processing is completed, the cooperation application 310 displays on the operation unit 116 of the communication terminal 102 the top menu screen in FIG. 5A.

First, the function of the cooperation application 310 will be described with reference to the top menu screen. An icon 501 is used to display a menu bar for checking application settings, help, information, or the like.

A region 502 displays the currently-selected cooperation destination MFP. In the present exemplary embodiment, the case where the MFP 101 is designated as a cooperation destination is described as an example. By selecting the region 502, the user can change the cooperation destination MFP or can check the state of the cooperation destination MFP and the capability of the MFP. An addition key 503 is a key for providing the function of registering a new cooperation destination MFP. The user can register a new cooperation destination MFP using the addition key 503. The cooperation application 310 stores as a device list in the storage 114 information about each MFP for which an instruction to register the MFP as a cooperation destination is provided by a user operation. Thereafter, the MFPs registered in the device list can be selected as a cooperation destination MFP.

The cooperation application 310 can cooperate with the MFP, e.g., MFP 101, designated as a cooperation destination to execute various cooperation functions. A document key 504 is used to transmit image data and/or document data stored in the communication terminal to the cooperation destination MFP and execute printing. A scan key 505 is used to execute the scan cooperation function of scanning a document with the cooperation destination MFP and retrieving into the storage 114 of the communication terminal the data acquired by the scan. A capture key 506 is used to capture an image of a document, a white board, or the like using the camera 118. A panel login key 507 is used to execute the cooperation login function to cause a specific user to log into the MFP.

The user authentication information setting for the login function that is needed to use the cooperation login function will be described below. If the communication terminal 102 detects the selection of the icon 501 by the user, the communication terminal 102 displays the menu bar (not illustrated). If a user operation is performed to make the application setting from the menu bar, the screen is changed to the setting screen of the cooperation application 310.

The cooperation application 310 includes a large number of setting items. Therefore, it is difficult to configure all the settings within the same screen. Thus, the screen is changed to a separate setting screen for each setting item or function to make each setting. If a user operation is performed on the setting screen to make the setting for the cooperation login function, the communication terminal 102 displays a user authentication information setting screen for login.

FIG. 5B illustrates an example of the user authentication information setting screen for login. The user can set user information for use in the cooperation login function via the screen in FIG. 5B. An item 511 is an item for setting user credentials for use in the cooperation login function. The user can set user authentication information (user name, password, and domain name) by selecting each item. The set user authentication information is stored in the storage 114 and referenced when needed in the flowcharts described below. A toggle button 512 is a button enabling selection whether to use the same user information in printing. If a user instruction to change the toggle button 512 to "ON" is received, the communication terminal 102 changes a handover setting to "enabled". If the toggle button 512 is set to "OFF", the communication terminal 102 changes the handover setting to "disabled".

If the handover setting is enabled, the user authentication information set in the item 511 can be handed over to the authentication information as a print setting in the print function that is a cooperation function different from the login function (details thereof will be described below). If the selection of an end button is detected, the CPU 111 stores in the storage 114 the user authentication information set in the item 511 and the handover setting changed by an operation of the toggle button 512. The setting stored in the storage 114 is referenced when needed in the flowcharts described below.

The print function will now be described. If the CPU 111 detects the selection of the document key 504 by the user, the screen is changed to a document selection screen. FIG. 6A illustrates an example of a document selection screen displayed after the document key 504 is selected. A list of documents stored in the communication terminal 102 is displayed on the selection screen in FIG. 6A. If the CPU 111 detects the selection of information indicating a document, such as an item 601 displayed on the selection screen, the screen to be displayed on the operation unit 116 is changed to a preview screen. FIG. 6B illustrates an example of a preview screen. The CPU 111 displays in a region 611 of the preview screen a preview image for checking details of printing. The preview image displayed in the region 611 is generated based on document data selected on the selection screen. The CPU 111 can generate a preview image or a request for preview image generation can be transmitted to a cloud service (not illustrated) to cause the cloud service to generate a preview image.

A region 613 displays print settings to be made for print data to be transmitted to the MFP. The region 613 also functions as a display item for changing to a print setting screen. The user can make detailed print settings by selecting the region 613. Print settings such as the output sheet size and the number of copies and authentication information for use in authentication printing can be set on the print setting screen. A print key 614 is used to print a selected document.

Figure 7:
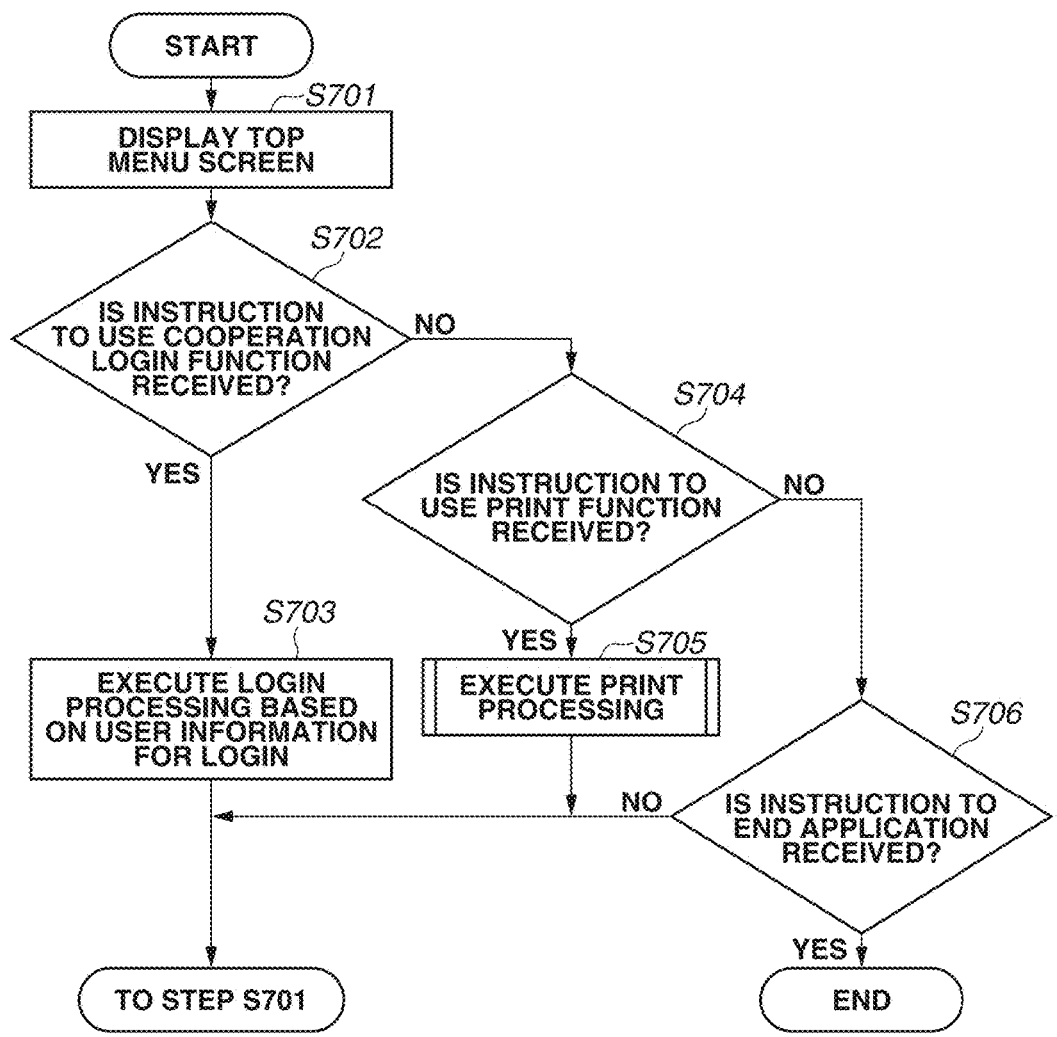
FIG. 7 is a flowchart illustrating control of the communication terminal.
Figure 8:
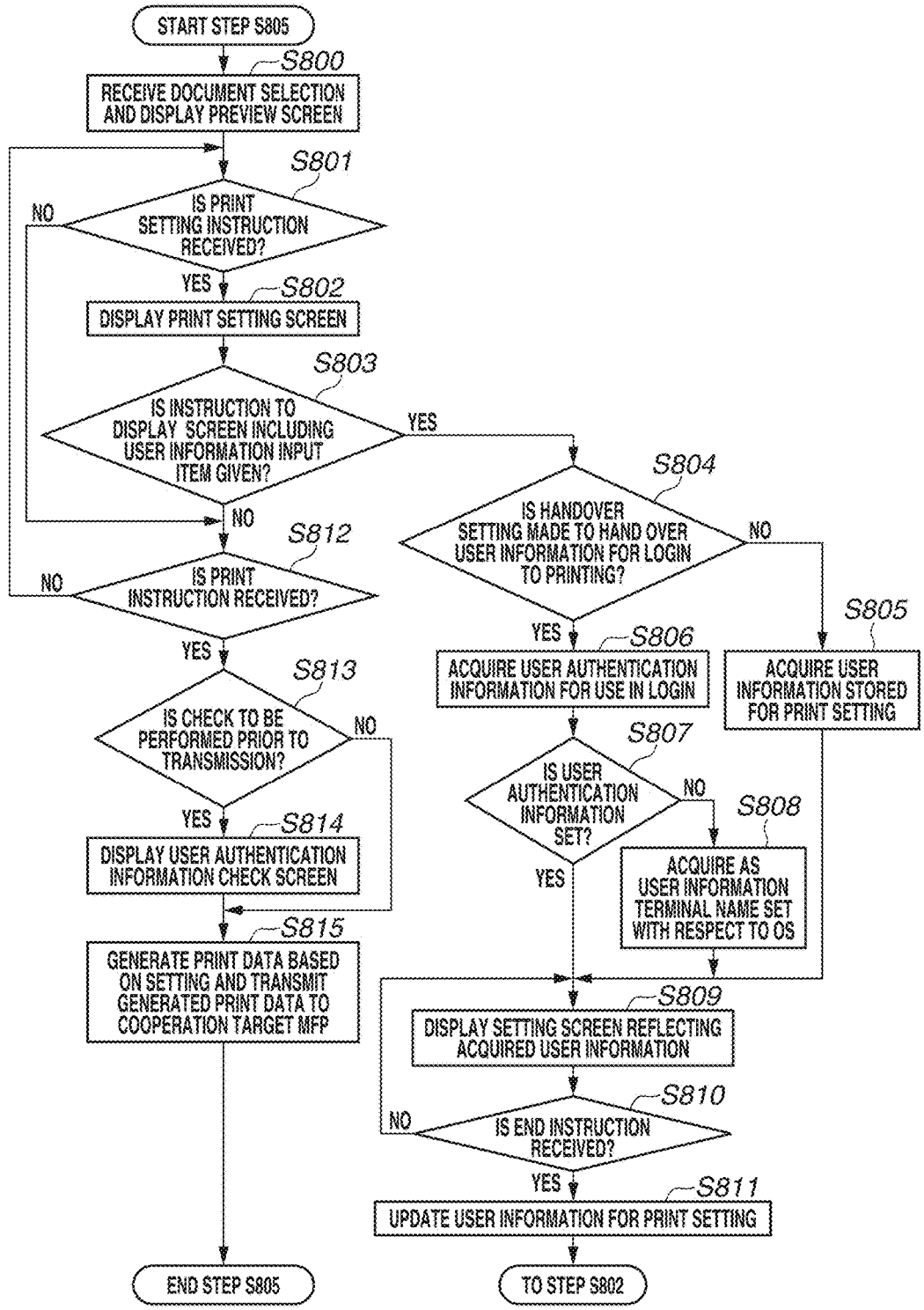
FIG. 8 is a flowchart illustrating control of the communication terminal.

Specific control for simplifying the setting of authentication information needed for authentication processing using user information for use in login cooperation will be described below with reference to the flowcharts in FIGS. 7 and 8. FIGS. 7 and 8 are flowcharts illustrating the control of the communication terminal 102.

The CPU 111 reads into the RAM 113 a program for realizing each control module that is stored in the ROM 112 or the storage 114 and executes the read program to realize each operation (step) specified in the flowcharts in FIGS. 7 and 8. Each process in the flowcharts is realized by the cooperation application 310 being a main subject in cooperation with the OS 300, which is a control program. When the control program being the main subject causing an operation is to be specifically identified, the operation will be described with the OS 300 or the cooperation application 310 being the main subject.

FIG. 8 is a flowchart illustrating operations of the communication terminal 102 in the case where the icon of the cooperation application is selected via the drawer or the home screen of the communication terminal 102.

In step S701, the CPU 111 displays the top menu screen on the operation unit 116. In step S702, the CPU 111 determines whether a user instruction to use the cooperation login function is received. If a user instruction to use the cooperation login function is received (YES in step S702), the processing proceeds to step S703. If no user instruction to use the cooperation login function is received (NO in step S702), the processing proceeds to step S704. Examples of a user operation to use the cooperation login function include an operation to select the key 507 displayed on the top menu screen in FIG. 5A.

In step S703, the CPU 111 executes cooperation login processing with respect to the MFP. Specifically, if the CPU 111 detects an approach to the MFP 101 based on the radio wave intensity of Bluetooth® Low Energy communication, or the like, the CPU 111 performs short-range wireless communication with the MFP to transmit a login request. The login request contains the user authentication information for the cooperation login function that is stored in the storage 114. The MFP 101 determines whether to enable the user to log in based on the login request received from the communication terminal 102. If the MFP 101 enables the login from the communication terminal 102, the MFP 101 displays the main screen (not illustrated) on the operation unit 136. The user can use the functions (copy function, scan data transmission function, etc.) of the MFP 101 via the main screen displayed on the operation unit 136.

As described above, the user enables the MFP 101 to cause the user to log in by simply bringing the communication terminal 102 closer to the MFP 101. This function enables the user to log into an MFP by simply holding the user's communication terminal near/over the MFP. Thus, the time and work needed to input a user ID and a password to log into an MFP can be reduced. While the local login is described as an example of the cooperation login function in the present exemplary embodiment, the cooperation login function is not limited to the local login. For example, the cooperation login function can be the login (referred to as "remote login") to realize remote access to a resource to be provided by the MFP 101, from the communication terminal 102.

In step S703, if the cooperation login processing ends, the CPU 111 changes the screen displayed on the operation unit 116 to the top menu screen, and the processing returns to step S701.

In step S704, the CPU 111 determines whether a user instruction to use the print function is received. If a user instruction to use the print function is received (YES in step S704), the processing proceeds to step S705. If no user instruction to use the print function is received (NO in step S704), the processing proceeds to step S706. Examples of a user operation to use the print function include an operation to select the key 504 displayed on the top menu screen in FIG. 5A.

In step S705, the CPU 111 executes print processing to transmit print data to the MFP 101. Details of the print processing will be described below with reference to the flowchart in FIG. 8.

In step S706, the CPU 111 determines whether an instruction to end the application is received. If an instruction to end the application is received (YES in step S706), the CPU 111 stops execution of the cooperation application 310 and changes the screen displayed on the operation unit 116 to the home screen provided by the home application of the OS 300, and the series of control ends. If no instruction to end the application is received (NO in step S706), the processing returns to step S701.

If the CPU 111 receives a user instruction to use another function, which is not illustrated in the flowchart in FIG. 7, the other function based on the user instruction is executed. For example, the CPU 111 can execute the scan cooperation function in which the MFP 101 and the communication terminal 102 cooperate to scan a sheet document and transmit and save the scanned sheet document. The CPU 111 can execute, for example, the function of capturing images using the camera 118.

As described above, while the cooperation application 310 is activated, the user can execute various functions including the cooperation login function and the print function.

Next, the print processing will be described with reference to the flowchart in FIG. 8. In step S800, the CPU 111 receives document selection and displays a preview screen of the document for which the selection is received.

In step S801, the CPU 111 determines whether a print setting instruction is received. If a print setting instruction is received (YES in step S801), the processing proceeds to step S802. If no print setting instruction is received (NO in step S801), the processing proceeds to step S812. Examples of a print setting instruction include a user instruction to select the region 613 described as an example in FIG. 6B.

In step S802, the CPU 111 displays the print setting screen. FIGS. 9A, 9B, 9C, and 9D illustrate an example of the screen displayed on the operation unit 116 of the communication terminal 102. FIGS. 9A to 9D each illustrate an example of a screen relating to the print function, and FIG. 9A illustrates an example of the print setting screen.

The user can edit various print settings via the print setting screen. Items 901 and 902 are items of the print settings. The item 901 is selected to set authentication information for authentication printing as the print settings. If the CPU 111 receives the selection of the item 901, the CPU 111 displays an authentication function management screen illustrated as an example in FIG. 9B.

The user can select via the management screen an authentication method for use in print data transmission. FIG. 9B illustrates as an example a case where the user authentication to add user authentication information to print data is selected.

An "off" key is selected in a case where authentication printing is not to be used. A "department ID management" key is used to add a department ID and a password to print data to be transmitted. The user uses the "department ID management" key to change the setting to the setting of executing authentication printing using the department ID.

A user authentication key 912 is used to add user authentication information to print data to be transmitted. If the CPU 111 detects the selection of the user authentication key 912, the CPU 111 switches the screen displayed on the operation unit 116 to the user authentication information setting screen. FIG. 9C illustrates an example of the user authentication information setting screen. The user can set via the setting screen a user name 921 and a password 922 for use in authentication printing. The user can set via a toggle button 923 whether to check the authentication settings at the time of printing. If a user instruction to change the toggle button to "ON" is received, the communication terminal 102 changes the check setting to "enabled". If the toggle button is set to "OFF", the check setting is changed to "disabled". When the check setting is enabled, check processing can be performed at the time of printing (details thereof will be described below with reference to steps S805 and S806). The changed check setting is stored in the storage 114 and referenced when needed in the flowcharts described below.

The output method key 902 is used to change the output format. If the CPU 111 detects the selection of the key 902, the screen displayed on the operation unit 116 is changed to the selection screen illustrated as an example in FIG. 9D on which the output format is to be selected. FIG. 9D illustrates as an example a case where "print" is selected. A user name 931 and a domain name 932 are settable on the output method selection screen. The foregoing settings are used to discriminate a print queue in counting the number of sheets to be printed for each user or hold printing. As described above, there are cases where user authentication information or information indicating the user is set even in the print setting made with respect to print data, as illustrated in FIGS. 9C and 9D. In the following description of step S803 and subsequent steps, a scheme that simplifies the setting of user authentication information and information indicating the user in the above-described cases will be described.

The following is a continuation of the description of FIG. 8. In step S803, the CPU 111 determines whether an instruction to display the print setting screen including a user information input item is given. If an instruction to display the print setting screen including a user information input item is given (YES in step S803), the processing proceeds to step S804. If no instruction to display the print setting screen including a user information input item is given (NO in step S803), the processing proceeds to step S812. Examples of an instruction to display the screen including a user information input item include a user instruction to change to a screen which requires user information input, such as the items 912 and 902 in FIGS. 9A, 9B, 9C, and 9D.

In step S804, the CPU 111 determines whether the handover setting is made to hand over the user information for login to the printing. If the handover setting is enabled (YES in step S804), the processing proceeds to step S806. If the handover setting is not enabled (NO in step S804), the processing proceeds to step S805. In step S805, the CPU 111 acquires the user information stored for the print setting.

In step S806, the CPU 111 acquires the user authentication information for login that is stored in the storage 114. In step S807, the CPU 111 determines whether user authentication information is set based on the user authentication information acquired in step S806. If user authentication information is set (YES in step S807), the processing proceeds to step S809. If user authentication information is not set, e.g., if the acquired user authentication information is blank or NULL, (NO in step S807), the processing proceeds to step S808. In step S808, the CPU 111 acquires as user information the terminal name set with respect to the OS 300. Specifically, the cooperation application 310 calls the mathematical function to acquire the terminal name of the communication terminal 102 and transmits an inquiry about the terminal name to the OS 300. In response to the inquiry, the OS 300 returns the terminal name to the cooperation application 310. While the terminal name is described as an example in the present exemplary embodiment, information to be acquired is not limited to the terminal name. For example, the account name of the holder of the terminal can be acquired.

In step S809, the CPU 111 displays a screen reflecting the acquired user information. First, a case will be described where user authentication information for login is acquired. In this case, the user information set in FIG. 5B is reflected as illustrated in FIGS. 9C and 9D. In this way, the user information for login that is for use in another cooperation function can be reflected in the case of displaying the print setting screen including a field for displaying user information. Thus, the user no longer needs to set the same user information (user name, password, domain name) in a plurality of places, so that the setting is simplified. In the case where user authentication information for login is not set, the terminal name or the account name of the holder of the terminal is acquired to reflect the acquired information. In the case where the handover setting is disabled, it is possible not to perform handover.

In step S810, the CPU 111 determines whether an end instruction is received. If an end instruction is received (YES in step S810), the processing proceeds to step S811. If no end instruction is received (NO in step S810), the CPU 111 waits for a user operation. Examples of an end instruction include a user instruction to select a display item to return to the previous screen displayed at the upper left of the screen.

In step S811, the CPU 111 updates the user information for print setting. The user information for print setting is stored in the storage 114. If the print setting on the screen including the user information in steps S804 to S811 described above ends, the processing returns to step S802 to wait for receipt of another print setting.

Next, in step S812, the CPU 111 determines whether a print instruction is received. If a print instruction is received (YES in step S812), the processing proceeds to step S813. On the other hand, if no print instruction is received (NO in step S812), the processing returns to step S801. Examples of a print instruction include the press of the print key 614 described as an example in FIG. 6B. Alternatively, any other method can be used to determine that a print instruction is received. For example, it can be determined that a print instruction is provided upon condition that the MFP 101 and the communication terminal 102 are brought close to each other while the screen illustrated in FIG. 6B is displayed. For example, it can be determined that a print instruction is provided upon condition that the communication terminal 102 detects a shake gesture, or the like, while the screen in FIG. 6B is displayed.

In step S813, the CPU 111 determines whether to perform a check prior to transmission. The processing proceeds to step S814 if the print setting to perform authentication is made and the check setting is enabled. If the print setting to perform authentication is not made or if the print setting to perform authentication is made but the check setting is disabled, step S814 is skipped, and the processing proceeds to step S815.

Figure 10:
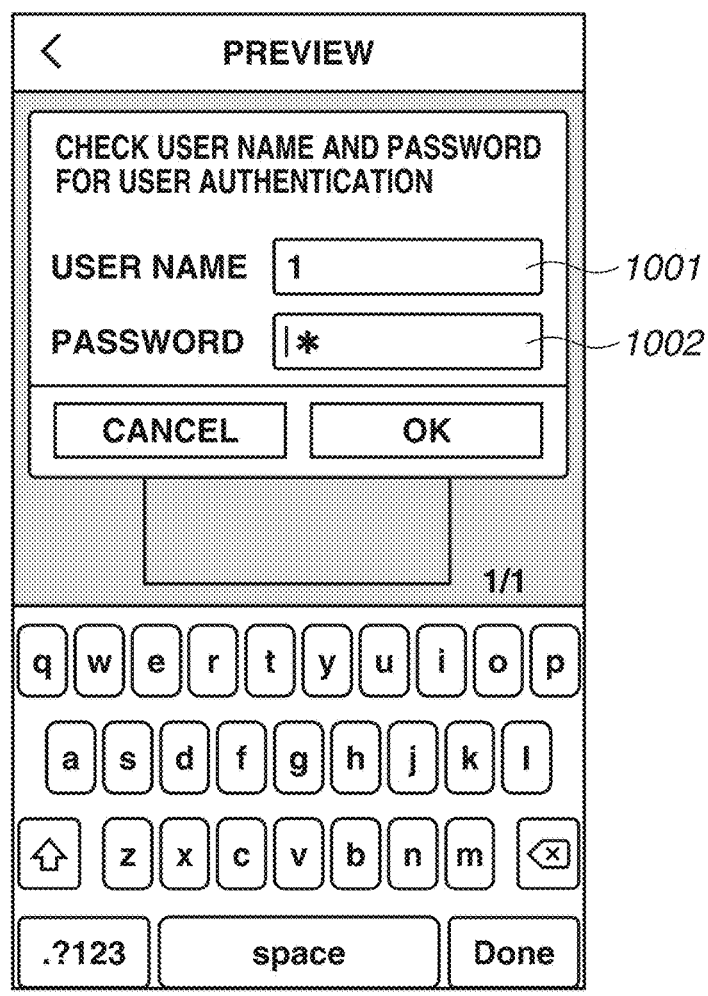
FIG. 10 illustrates an example of the screen displayed on the operation unit of the communication terminal.

In step S814, the CPU 111 displays a user authentication information check screen. FIG. 10 is a screen displayed on the operation unit 116 of the communication terminal 102, illustrating an example of a check screen displayed by the cooperation application 310.

The user can check the user authentication information via the check screen. The user can correct the user authentication information via the check screen. For example, the user can input a password via the screen if, for example, a user ID 1001 is set but a password 1002 is not preset. If the CPU 111 receives a user instruction to end the check, the processing proceeds to step S815.

In step S815, the CPU 111 generates print data based on the print setting and the data on the document selected in step S800. If the print data is completely generated, the print data is transmitted to the cooperation destination MFP, and the series of processing ends. In the present exemplary embodiment, the print data is transmitted to the cooperation destination MFP using 802.11-based wireless communication. The print data can be transmitted using wireless communication via the AP 103 or a software AP provided by the MFP 101. Alternatively, direct wireless communication using Wi-Fi Direct® can be established to transmit the print data using P2P wireless communication, or the print data can be transmitted through P2P wireless communication using Wi-Fi Aware™.

If the print setting to add user authentication to print data is made, print data with user authentication information (user ID and password) added is transmitted. If the print setting to add a department ID to print data is made, print data with a department ID and a password added is transmitted.

As described above, in the present exemplary embodiment, the setting of authentication information necessary for authentication printing is simplified using user information for use in login cooperation in a mobile terminal configured to cooperate with an image processing apparatus. Since whether to enable the handover setting is settable, operations can be performed without a handover of user authentication information for login cooperation.

While the case where a handover of user authentication information for login cooperation is performed at the timing specified in steps S804 to S808 is described as an example in the present exemplary embodiment, the timing is not limited to the above-described timing. For example, user authentication information as the print setting or information indicating the user can be overwritten and updated at the timing at which the setting of user authentication information for login cooperation is ended. In this case, the CPU 111 performs determination similar to that performed in step S804 at the timing at which an end key is selected via the setting screen illustrated as an example in FIG. 5B. If the handover setting is not enabled, control is performed not to overwrite the user information as the print setting. If the handover setting is enabled, the CPU 111 overwrites and updates the user authentication information and the information indicating the user as the print setting that are stored in the storage 114, based on the user authentication information acquired in step S807 or S808. As described above, the user authentication information as the print setting can be updated at the timing at which the user authentication information for login cooperation is updated. In the case where the above-described update form is employed, the CPU 111 reads the user authentication information or the information indicating the user as the print setting, each of which is stored in the storage 114, and reflects the read information to the setting screen if an instruction to change to the screen including the user information input item is received.

Next, a second exemplary embodiment will be described below. In the first exemplary embodiment, an example is described in which the user authentication information for the cooperation login function is handed over to the print setting of the print function. In the second exemplary embodiment, a case will be described in which control is performed based on the capability information about the cooperation destination MFP in addition to the control in the first exemplary embodiment. The control is performed to switch, as appropriate, the display UI regarding the authentication printing in the case of making the print setting, based on the authentication function supported by the MFP and the setting of the authentication function of the MFP.

In the second exemplary embodiment, the hardware configurations of apparatuses are similar to those in the first exemplary embodiment. Detailed description of the configurations that are similar to those in the first exemplary embodiment is omitted.

<MFP Capability Information Acquisition Processing>

First, the acquisition of MFP capability information and the change of the cooperation destination MFP will be described. As described above, the communication terminal 102 stores in the storage 114 the device list storing the management information about the cooperation destination MFP.

The communication terminal 102 acquires capability information about a new MFP in a case of registering the new MFP as a cooperation destination, in a case of receiving a user instruction to update the capability information about the registered cooperation destination to the latest state, or the like. The acquired capability information about the MFP 101 is stored in the device list. The communication terminal 102 acquires information about capabilities regarding printing, such as an output sheet size, a color/monochrome setting, and the presence/absence of a post-processing function, and information about the user management function of the MFP, etc., as capability information. In the present exemplary embodiment, the display UI regarding the authentication printing is switched as appropriate using the information about the user management function that is acquired as capability information from the MFP.

Specific control will be described below with reference to the flowcharts in FIGS. 11 and 12. The CPU 111 reads into the RAM 113 a program for realizing a control module that is stored in the ROM 112 or the storage 114 and executes the read program to realize the operations (steps) specified in the flowcharts in FIGS. 11 and 12.

FIG. 11 is a flowchart illustrating the control in the communication terminal 102 in a case where the display UI is switched due to an occurrence of an event. For example, in the present exemplary embodiment, if a new MFP is registered as a cooperation destination, the configuration information for configuring the display UI is updated based on the capability information acquired from the new MFP. If a user instruction to update the capability information about the cooperation destination to the latest state is received, capability information is re-acquired from the MFP, and the configuration information for configuring the display UI is updated. If an instruction to change the cooperation destination is received, the configuration information for configuring the display UI is updated based on the capability information about the changed cooperation destination MFP.

In step S1101, the CPU 111 determines whether an instruction to acquire or update management information is received. If an instruction to acquire or update management information is received (YES in step S1101), the processing proceeds to step S1102. If no instruction to acquire or update management information is received is received (NO in step S1101), the processing proceeds to step S1103.

In step S1102, the CPU 111 acquires capability information from the counterpart MFP and stores the acquired capability information in the device list. In step S1102, the name of the MFP, connection information for connecting to the MFP, etc. are also acquired besides the capability information.

In step S1103, whether a user instruction to change the cooperation destination MFP is received is determined. If a user instruction to change the cooperation destination MFP is received (YES in step S1103), the processing proceeds to step S1104. If no user instruction to change the cooperation destination MFP is received (NO in step S1103), the process ends without updating the display UI configuration information.

In step S1104, the CPU 111 changes the cooperation destination MFP and acquires capability information about the changed MFP from the device list.

In step S1105, the CPU 111 extracts information about the authentication function from the capability information acquired in step S1102 or S1104. If the extraction is completed, the processing proceeds to step S1106.

In step S1106, the CPU 111 updates the configuration information based on the capability information about the authentication function that is extracted in step S1105. Details of the processing in step S1106 will be described with reference to the flowchart in FIGS. 12A and 12B.

In step S1201, the CPU 111 checks the authentication function supported by the MFP based on the extracted capability information about the authentication function. FIGS. 13A and 13B illustrate the correspondence between the acquired capability information and configuration information. The cooperation application 310 supports cooperation with various types of MFPs, and the supported authentication function differs for each MFP. The MFPs are classified into (1) MFPs that support both the department ID management and the user authentication management, (2) MFPs that support only the department ID management, or (3) MFPs that support neither of the authentication functions, as specified by information 1301. In FIG. 13A, whether the MFP supports the authentication function is specified by "supported" or "not supported".

Even if a MFP supports the authentication management function, whether to enable the authentication management function can differ depending on the operation policy of the MFP. In information 1302, "ON" indicates that the function is enabled, and "OFF" indicates that the function is enabled (disabled). In the subsequent steps, the configuration information for displaying the UI of the print setting screen is updated based on the combination to which the acquired capability information corresponds among the combinations.

Information 1303 indicates information illustrating the configuration information. The mark "○" indicates that the item is to be displayed such that the user can select the item, and the mark "-" indicates that the item is not displayed. Further, the mark "*" indicates an item to be selected as an initial value.

The communication terminal 102 stores in the storage 114 as the configuration information the configuration information illustrated in FIG. 13B. A bit 1304 indicating that an item is or is not to be displayed and a bit 1305 indicating an initial value are stored as configuration information. The update of the configuration information will be described with reference to step S1202 and subsequent steps.

In step S1202, the CPU 111 determines whether the MFP supports the authentication function based on the result of step S1201. If the MFP supports any of the authentication functions (YES in step S1202), the processing proceeds to step S1205. If the MFP supports none of the authentication functions (NO in step S1202), the processing proceeds to step S1203.

In step S1203, the CPU 111 changes configuration information 1305 about the initial value stored in the storage 114 to "OFF" (i.e., 0b00). In step S1204, the CPU 111 updates configuration information 1304 to configuration information indicating that all the items are not to be displayed, i.e., the configuration information 1304 is updated to 0b000. If the processing in step S1204 is completed, the series of configuration information update processes ends.

The above-described processing provides that the communication terminal 102 changes the control in the case of displaying the print setting screen. A specific example will be described with reference to FIGS. 14A, 14B, 14C, and 14D. FIGS. 14A, 14B, 14C, and 14D illustrate an example of the screen displayed on the operation unit 116 of the communication terminal 102, illustrating a display example of the screen based on the configuration information. FIG. 14A illustrates an example of the screen displayed in the case where the configuration information, i.e., 0b00000, described in steps S1203 and S1204 is set. If the CPU 111 receives a user instruction to display the print setting screen, the CPU 111 refers to the configuration information and performs control not to display an item for selecting the "user management function". By this processing, the item for making the authentication printing setting that is unnecessary in the cooperation destination MFP is not displayed if the cooperation destination MFP is a MFP that does not use the user management function.

In step S1205, whether the MFP supports the user authentication is determined based on the result of step S1201. If it is determined that the MFP supports the user authentication (YES in step S1205), the processing proceeds to step S1210. If it is determined that the MFP does not support the user authentication (NO in step S1205), the processing proceeds to step S1206.

In step S1206, the CPU 111 refers to the department ID management setting in the acquired capability information. In step S1207, whether the MFP is set to enable the department ID management is determined based on the department ID management setting to which the CPU 111 refers in step S1206. If the department ID management setting is enabled (ON) (YES in step S1207), the processing proceeds to step S1208. If the department ID management setting is disabled (OFF) (NO in step S1207), the processing proceeds to step S1203.

In step S1208, the CPU 111 updates the configuration information 1305 about the initial value to the department ID management, i.e., 0b01. In step S1209, the CPU 111 updates the configuration information 1304 to configuration information that displays the items "OFF" and "department ID management" and does not display the item "user authentication", i.e., the configuration information 1304 is updated to 0b110. If the processing in step S1208 is completed, the series of the configuration information update processes ends.

FIG. 14D illustrates an example of the screen displayed in the case where the configuration information, i.e., 0b11001 described in steps S1208 to S1209 is set. By this processing, the user authentication management setting that cannot be accepted by the cooperation destination MFP is not displayed if the cooperation destination MFP is a MFP that uses the department ID management.

In step S1210, the CPU 111 refers to the user authentication management setting in the acquired capability information. In step S1211, the CPU 111 determines whether the MFP is set to enable the user authentication based on the user authentication management setting to which the CPU 111 refers in step S1210. If the user authentication management setting is enabled (ON) (YES in step S1211), the processing proceeds to step S1214. If the user authentication management setting is disabled (OFF) (NO in step S1211), the processing proceeds to step S1212.

In step S1212, the CPU 111 refers to the department ID management setting in the acquired capability information. In step S1213, the CPU 111 determines whether the MFP is set to enable the department ID management based on the department ID management setting to which the CPU 111 refers in step S1212. If the department ID management setting is enabled (ON) (YES in step S1213), the processing proceeds to step S1208. If the department ID management setting is disabled (OFF) (NO in step S1213), the processing proceeds to step S1203.

In step S1214, the CPU 111 refers to the department ID management setting in the acquired capability information. In step S1215, the CPU 111 determines whether the MFP is set to enable the department ID management based on the department ID management setting to which the CPU 111 refers in step S1214. If the department ID management setting is enabled (ON) (YES in step S1215), the processing proceeds to step S1218. If the department ID management setting is disabled (OFF) (NO in step S1215), the processing proceeds to step S1216.

In step S1216, the CPU 111 updates the configuration information 1305 about the initial value to the user authentication, i.e., 0b10. In step S1217, the CPU 111 updates the configuration information 1304 to configuration information that displays the items "OFF" and "user authentication" and does not display the item "department ID management", i.e., the configuration information 1304 is updated to 0b101. If the processing in step S1216 is completed, the series of configuration information update processes ends.

FIG. 14C illustrates an example of the screen displayed in the case where the configuration information, i.e., 0b10110 described in steps S1216 and S1217 is set. By this processing, the department ID management setting that cannot be accepted by the cooperation destination MFP is not displayed if the cooperation destination MFP is a MFP that uses the user authentication.

In step S1218, the CPU 111 updates the configuration information 1305 about the initial value to the department ID management, i.e., 0b01. In step S1219, the CPU 111 updates the configuration information 1304 to configuration information that displays all the items, i.e., the configuration information 1304 is updated to 0b111. If the processing in step S1218 is completed, the series of configuration information update processes ends.

FIG. 14B illustrates an example of the screen displayed in the case where the configuration information, i.e., 0b11101 described in steps S1218 and S1219 is set. By this processing, all the items are displayed so that the user can select a desired function if the cooperation destination MFP is a MFP that uses both the user authentication and the department ID management.

As described above, the present exemplary embodiment produces the following advantage in addition to the advantage of the first exemplary embodiment. In the present exemplary embodiment, the display UI regarding the authentication printing in the case of making the print setting is switched as appropriate based on the authentication function supported by the cooperation destination MFP and the authentication function setting of the MFP based on the capability information acquired from the cooperation destination MFP. Thus, only the authentication function that can be used in the cooperation destination MFP is displayed on the authentication printing setting screen. By the above-described control, the user can select the authentication function without considering the type of the authentication function supported by the MFP and the operation policy of the MFP.

While the case where the CPU 111 performs the control specified in the flowchart in FIGS. 12A and 12B and updates the configuration information regarding the print setting screen display control is described as an example, the case is not a limiting example. For example, a table for the reference of configuration information is generated in advance using the capability information acquired from the MFP as a key, and configuration information is derived using the reference table.

While the case where control is performed such that the setting item that cannot be accepted by the cooperation destination MFP is not displayed is described as an example in the present exemplary embodiment, the display form is not limited to that described above. For example, the setting item that cannot be accepted by the cooperation destination MFP can be grayed out. In this case, the CPU 111 displays the display item to be grayed out while no user operation and selection are to be accepted.

Modified Example

While the case where the user authentication information for use in login is handed over (reflected) to the print setting has been described above as an example in the first and second exemplary embodiments, this is not a limiting case. For example, a setting of user authentication information to be shared in the cooperation functions by the cooperation application 310 is made, and the user authentication information to be shared is handed over to the setting screens of a plurality of functions.

Each of the exemplary embodiments described above simplifies the setting of authentication information necessary for authentication printing using user information for use in login in a mobile terminal configured to communicate with an image processing apparatus. The present disclosure simplifies the setting of user information for use in processing.

Other Embodiments

Embodiments can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-101044, filed May 22, 2017, which is hereby incorporated by reference herein in its entirety.

What is claimed is:

1. A communication terminal configured to communicate with an image processing apparatus, the communication terminal comprising:
   a display device;
   a memory device that stores a set of instructions; and
   at least one processor that executes the instructions, the instructions, when executed, causing the communication terminal to perform operations comprising:
   receiving a user operation of a user credential input, and, based on the input, setting a user credential that is used for logging into the image processing apparatus;
   receiving a user operation for changing a setting, and, based on the received user operation, setting whether to hand over a setting of the user credential that is used for login to a print setting;
   performing control to display, on the display device, a setting screen for receiving a print setting regarding print data to be transmitted to the image processing apparatus; and
   performing control to display, on the display device, in response to receipt of a user operation to display a reception screen for receiving a setting of authentication information to be added to the print data in a handover enabled state, in which it is set to hand over the setting of the user credential that is used for login to the print setting, the reception screen for receiving the setting of the authentication information to be added to the print data and on which the user credential that is used for login is preset for the setting of the authentication information to be added to the print data, and to display, on the display device, in response to receipt of a user operation to display the reception screen in a handover disabled state, in which it is set not to hand over the setting of the user credential that is used for login to the print setting, the reception screen for receiving the setting of the authentication information to be added to the print data and on which the user credential that is used for login is not preset for the setting of the authentication information to be added to the print data.

2. A method of controlling a communication terminal, the method comprising:
   receiving a user operation of a credential input, and based on the input, setting a user credential that is used to log into an image processing apparatus;
   receiving a user operation for changing a setting, and, based on the received user operation, setting whether to hand over a setting of the user credential that is used for login to a print setting;
   transmitting print data to the image processing apparatus; and
   performing control to display a setting screen for receiving a print setting regarding print data to be transmitted to an image processing apparatus,
   performing control to display, in response to receipt of a user operation to display a reception screen for receiving a setting of authentication information to be added to the print data in a handover enabled state, in which it is set to hand over the setting of the user credential that is used for login to the print setting, the reception for receiving the setting of the authentication information to be added to the print data and on which the user credential that is used for login is preset for the setting of the authentication information to be added to the print data, and to display, on the display device, in response to receipt of a user operation to display the reception screen in a handover disabled state, in which it is set not to hand over the setting of the user credential that is used for login to the print setting, the reception screen for receiving the setting of the authentication information to be added to the print data and on which the user credential that is used for login is not preset for the setting of the authentication information to be added to the print data.

3. The method according to claim 2, further comprising:
acquiring capability information about the image processing apparatus from the image processing apparatus; and
determining, based on the acquired capability information, whether the image processing apparatus is an image processing apparatus that performs user authentication management,
wherein the reception screen on which the user credential that is used for login is preset is displayed upon determining that the image processing apparatus is the image processing apparatus configured to perform user authentication management and the user operation to display the reception screen for receiving the setting of the authentication information to be added to the print data is received in the handover enabled state.

4. The method according to claim 3, wherein, based on the acquired capability information, a display item for changing to the reception screen for receiving the setting of the authentication information is not displayed on the setting screen for receiving the print setting upon determining that the image processing apparatus is not the image processing apparatus that performs user authentication management.

5. The method according to claim 2, wherein, in response to receipt of the user operation to display the reception screen for receiving the setting of the authentication information to be added to the print data while the user credential is not set, the reception screen on which an account of a holder of the communication terminal or a terminal name of the communication terminal is preset for the setting of the authentication information to be added to the print data is displayed.

6. The method according to claim 2, wherein the user credential that is used for login contains at least a user identifier (ID) and a password.

7. The method according to claim 2, wherein the print data is transmitted using wireless communication based on Institute of Electrical and Electronics Engineers (IEEE) 802.11.

8. The method according to claim 2, further comprising:
displaying a second setting screen that includes a display item for receiving an input of the user credential that is used for logging into the image processing apparatus and a display item for accepting a setting change as to whether to hand over the user credential that is used for login or not.

9. A non-transitory computer-readable storage medium storing a computer-executable program for causing a computer to execute a method for controlling a communication terminal configured to communicate with an image processing apparatus, the method comprising:
receiving a user operation of a credential input, and based on the input, setting a user credential that is used to log into an image processing apparatus;
receiving a user operation for changing a setting, and, based on the received user operation, setting whether to hand over a setting of the user credential that is used for login to a print setting;
transmitting print data to the image processing apparatus; and
performing control to display a setting screen for receiving a print setting regarding print data to be transmitted to an image processing apparatus,
performing control to display, in response to receipt of a user operation to display a reception screen for receiving a setting of authentication information to be added to the print data in a handover enabled state, in which it is set to hand over the setting of the user credential that is used for login to the print setting, the reception for receiving the setting of the authentication information to be added to the print data and on which the user credential that is used for login is preset for the setting of the authentication information to be added to the print data, and to display, on the display device, in response to receipt of a user operation to display the reception screen in a handover disabled state, in which it is set not to hand over the setting of the user credential that is used for login to the print setting, the reception screen for receiving the setting of the authentication information to be added to the print data and on which the user credential that is used for login is not preset for the setting of the authentication information to be added to the print data.

10. The non-transitory computer-readable storage medium according to claim 9, wherein the computer-executable program is an application program installable in the communication terminal.

11. The non-transitory computer-readable storage medium according to claim 9, the method further comprising:
acquiring capability information about the image processing apparatus from the image processing apparatus; and
wherein the reception screen on which the user credential that is used for login is preset is displayed upon determining that the image processing apparatus is the image processing apparatus configured to perform user authentication management and the user operation to display the reception screen for receiving the setting of the authentication information to be added to the print data is received in the handover enabled state.

12. The non-transitory computer-readable storage medium according to claim 11, wherein, based on the acquired capability information, a display item for changing to the reception screen for receiving the setting of the authentication information is not displayed on the setting screen for receiving the print setting upon determining that the image processing apparatus is not the image processing apparatus that performs user authentication management.

13. The non-transitory computer-readable storage medium according to claim 9 wherein, in response to receipt of the user operation to display the reception screen for receiving the setting of the authentication information to be added to the print data while the user credential is not set, the reception screen on which an account of a holder of the communication terminal or a terminal name of the communication terminal is preset for the setting of the authentication information to be added to the print data is displayed.

14. The non-transitory computer-readable storage medium according to claim 9, wherein the user credential that is used for login contains at least a user ID and a password.

15. The non-transitory computer-readable storage medium according to claim 9, wherein the print data is transmitted using wireless communication based on IEEE 802.11.

* * * * *